Sept. 3, 1957  R. H. POSTAL  2,805,272

CABLE-TYPE THERMOCOUPLE AND CIRCUIT

Filed June 27, 1955

INVENTOR
Robert H. Postal
BY George H. Fritzinger
Agt.

United States Patent Office 2,805,272
                              Patented Sept. 3, 1957

2,805,272

CABLE-TYPE THERMOCOUPLE AND CIRCUIT

Robert H. Postal, Clifton, N. J., assignor, by mesne assignments, to McGraw-Edison Company, Elgin, Ill., a corporation of Delaware Application June 27, 1955, Serial No. 518,253

10 Claims. (Cl. 136—4)

This invention relates to novel thermocouples of cable-like construction and to fire-detection circuits including such thermocouples. More particularly, the present invention relates to novel thermocouples of indefinite continuous length having facility to generate a thermoelectric voltage between two of its conductor elements when heated to a predetermined temperature at any point or points along its length.

As is well known, if two dissimilar metals are brought into contact there is a difference of electric potential, and if the other ends of these metals are joined and the two junctions are maintained at different temperatures an electric current will be produced in the circuit thus formed. The junction between the metals which is heated is called the "hot junction" and the junction which is not heated is called the "cold junction." In the thermocouples of prior constructions, the hot junction is a definite, fixed, permanent point in the apparatus where the two dissimilar metals are positively joined. In the present novel cable-type thermocouple, the hot junction is not normally present but is a roving point or points which come into being wherever the the cable is heated to a predetermined temperature. This novel thermocouple construction is realized by using two conductors made of dissimilar metals having definite thermoelectric properties and placing them in side-by-side relationship while interposing therebetween a temperature-responsive spacing material which at lower or normal temperature has such high resistance that it is essentially an insulator but which, when heated at any point to a predetermined temperature, will become electrically conductive at the point to form effectively an electrical connection between the two conductors. This spacing material may be an electronic semiconductor or any other such material which has an inverse resistance-temperature characteristic in the temperature range of interest. Such thermocouple cable connected in an electric circuit with a relay, alarm or other electrical device forms its own voltage to operate such device without the need for an external source of voltage. Moreover, the voltage output of such thermocouple cable is dependent only on the applied temperature at any one point or points thereof and not upon the length of the cable which is heated.

Objects of my invention are therefore to provide novel fire detection apparatus and circuits capable of detecting and/or measuring high temperatures at any point or points in a continuous path without need for any constant or external source of voltage in the electric circuit.

Another object is to provide a novel thermocouple of indefinite length capable of generating a thermoelectric voltage when heated at any point or points along its length.

Another object is to provide a cable having thermoelectric properties at all points along its length.

Another object is to provide a thermocouple cable which is readily adaptable for measuring either maximum or average temperatures along its length.

Other objects and features of my invention reside in details of construction of the thermoelectric apparatus herein particularly described, as will be apparent.

In the description of my invention, reference is had to the accompanying drawings, of which:

Figure 1:
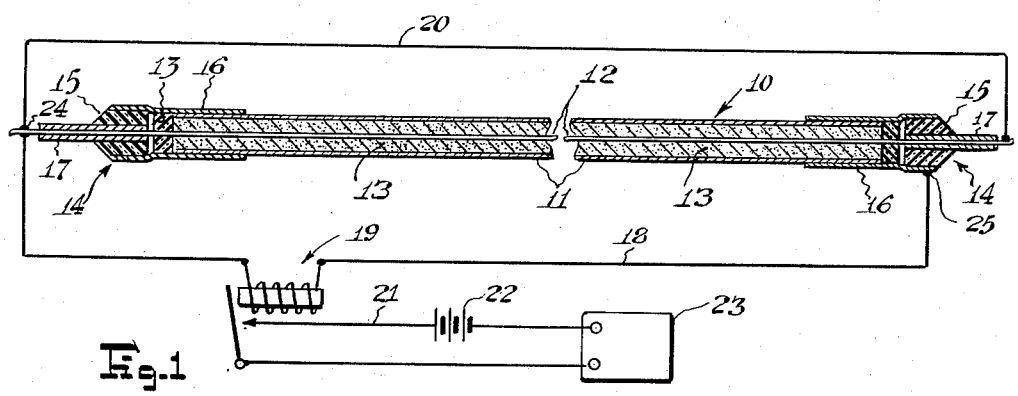
Figure 1 is an axial sectional view of a thermocouple cable and of a circuit therefor according to my invention.
Figure 2:
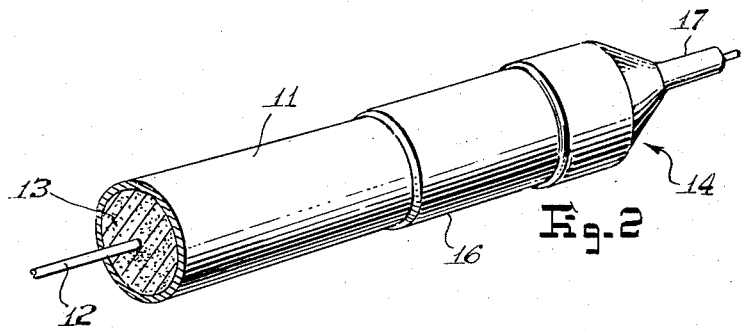
Figure 2 is a fractional perspective view, with one end in cross section, of the thermocouple cable shown in Figure 1.

In the embodiment of my invention shown in Figures 1 and 2, the thermocouple cable 10 comprises a tubular sheath 11, a center wire 12 and an intervening semiconductive spacing material 13. In this cable construction the sheath acts not only as a protective covering but also as a conductor and thermocouple member, the center wire 12 serves as a conductor and second thermocouple member, and the semiconductive material 13 serves normally as an insulative spacing material between the thermocouple members, which material becomes conductive to electrically connect the thermocouple members together whenever the same is heated.

The sheath and center wire are made of dissimilar metals, but the choice of metals may be varied widely to accommodate different desired conditions. The following couples are submitted by way of example:

| Sheath Material | Center Wire Material |
| --- | --- |
| Constantan (55% Cu, 45% Ni) | Copper. |
| Iron | Constantan. |
| Chromel (90% Ni, 10% Cr) | Constantan. |
| Chromel | Alumel (94% Ni, 2% Al, 1% Si, 2½% Mn, .5% Fe). |
| Platinum | Platinum-Rhodium (90% Pt, 10% Rh). |
| Inconel (77% Ni, 15% Cr, 7% Fe, .25% Mn). | Constantan. |

Of the foregoing couples, the Inconel-Constantan combination has particular advantages because of its high thermoelectric efficiency and because of the high oxidation resistance of Inconel at flame temperatures.

While I preferably employ electronic semiconductors of the p type as the core or spacing material, other types of semiconductors may be employed such as the n-type titanium oxide or mixed n and p types such as manganese titanate prepared by mixing equimolar portions of manganous (MnO) and titanium oxide (TiO$_2$) and sintering the same in air at temperatures of the order of 1200° C. Other suitable electronic semiconductors of the p type are cobalt oxide, manganese oxide, nickel oxide, chromium oxide and copper oxide. Cables employing these oxides may be fabricated, for example, in the manner disclosed in my pending joint application with Frederick G. Kelly, Serial No. 241,992, filed August 15, 1951 and entitled "Fire Detector Cable." Preferably, cables employing pure manganese oxide are fabricated in the manner disclosed in my pending application Serial No. 392,565, filed November 17, 1953 and entitled "Fire Detector Cable." Examples of n type semiconductors which may be employed are lead chromate (PbCrO$_4$), cuprous oxide (CuO), titanium sesquioxide (Ti$_2$O$_3$), barium oxide (BaO) and iron oxide (Fe$_2$O$_3$). The fabricating technique for these n-type semiconductors may follow the principles disclosed in the pending applications abovementioned. Of course, since these different semiconductors have different resistivities, the cables using them will develop thermal E. M. F.'s at different temperatures.

Very suitable among the p-type semiconductors is a lithium-doped manganese oxide which is desirably prepared as follows: An oxide of manganese, suitably manganous oxide (MnO) is mixed with lithium oxide ($Li_2O$), the lithium oxide being added in such amount as will provide the conductivity required for the end product. Preferably, the lithium element is initially added in the form of lithium acetate. For example, a suitable mixture is produced by adding manganous oxide in a water solution of lithium acetate in the proportion of about one part by weight of manganous oxide to .0903 part by weight of lithium acetate, mixing and concurrently heating the same until sufficient water is driven off to provide a thick sludge, and then heating in air to about 600° F. to decompose the lithium acetate and convert it to the oxide. This intermediate product is an intimate mixture of dry manganous oxide and lithium oxide.

The foregoing intermediate product is next heated in air to a sintering temperature of the order of 1200° C. for about one hour. It is believed that in this heating operation the lithium oxide enters the crystal lattice of the manganous oxide to provide a manganese-oxide product having lithium in chemical combination, this product being herein otherwise referred to as lithium-doped manganese oxide. As this product is cooled, oxygen of the air enters the lattice also to provide it with an excess of oxygen over the crystal requirements. Since such excess oxygen is undesirable, the excess oxygen is driven off, without however disturbing the lithium content, by heating the lithium-doped manganese oxide again in a reducing or neutral atmosphere of hydrogen or nitrogen to a temperature of the order of 1000° C. Next this oxide is washed to remove free lithium oxide.

By driving off the excess oxygen of the lithium-doped manganese oxide, the product is rendered stable since its conductivity is then dependent only upon the amount of lithium present.

Alternatively, instead of employing two separate heating steps, the composition may be cooled following the heating step in air, as follows: Firstly, it is allowed to cool while still in air to about 1000° C. Thereupon the cooling is continued to room temperature in an inert or reducing atmosphere. This may be accomplished in any suitable way by shifting the composition from an air atmosphere to an inert or reducing atmosphere when in the cooling thereof the temperature has fallen to about 1000° C. By so cooling the material no excess oxygen is taken up at any stage in the processing of the composition.

The lithium-doped manganese oxide here described is itself not herein claimed since the same is the subject matter of my co-pending application Serial No. 518,083 entitled "Fire Detector Cable" filed on even date herewith, now Patent No. 2,764,659, dated September 25, 1956.

The abovedescribed lithium-doped manganese oxide is next micropulverized so that it will pass through a 325-mesh screen. To this screened material there is added about 4% by weight of Veegum (magnesium aluminum silicate) and about 10% by weight of water to render the material somewhat plastic. This semiplastic material is extruded onto a clean Constantan center wire of about .040" diameter to a thickness of about .030" (i. e., an over-all diameter of .100"). After the extrusion has been dried in air it is fired in a neutral or reducing atmosphere at a temperature of about 1450° F. This step may for example be carried out by moving the extrusion through a heated zone of 8' length at the rate of about 1' per minute. The resultant fired extrusion is then inserted in a clean Inconel sheath having about .105" inside diameter and about .015" wall thickness. The loaded sheath is then drawn through suitable dies to reduce its diameter and bring the inner wall thereof into firm electrical contact with the extrusion. By successive swaging operations the sheath is reduced preferably to a diameter of about .070". A 5' length of such cable, using manganese oxide with a 3 atomic percent content of lithium as described, will have a resistance between the sheath and center wire of about 10 ohms when the cable is heated to about 500° F.

Since the swaging operation leaves the sheath in a hardened condition, the cable is next heat-treated at about 1000° C. for fifteen minutes in an oxidizing or reducing atmosphere in order to anneal the sheath and center wire as well as to stabilize the electrical resistivity of the semiconductive spacing material.

Following this annealing operation the ends of the cable are preferably closed airtight by hermetic seals 14 each comprising a glass or ceramic bead 15 fuzed to outer and inner tubing sections 16 and 17. These tubing sections are telescoped onto the sheath and wire respectively and the ends thereof are secured airtight to the sheath and wire as by silver soldering.

The sheath and center wire of the thermocouple cable are connected serially in a circuit 18 which serially includes only a receiving instrument 19 without any electromotive means since the thermocouple cable itself provides the operating voltage for the instrument 19 when any portion of the cable is heated by a flame remote from the cold-junction connections 24 and 25 whereat the circuit 18 is connected to the center wire and sheath. However, preferably the two ends of the center wire 12 are electrically joined by a wire 20. The receiving instrument 19 may be a relay controlling a circuit 21 itself including a battery 22 and a suitable alarm 23.

By choice of the electrical resistivity of the semiconductive spacing material, different modes of cable operation are obtained. For instance, if a spacing material of high resistivity is chosen, such that a 5' length of cable having such material will provide a resistance of 100 ohms when the 5' length is heated to 700° F., then the voltage output is proportional to the maximum temperature at which any portion of the cable is heated notwithstanding that the cable is heated to different temperatures along its length. On the other hand, if the semiconductive oxide has a substantially lower electrical resistivity such that a cable of 5' length will have a resistance of 100 ohms when the same is heated uniformly to 300° F., then such cable will provide an output voltage which is substantially proportional to the average temperature of the cable along its length when different portions of the cable are heated to different temperatures. As above described, the electrical resistivity of the semiconductive spacing material is set at the desired value by proportioning the amount of lithium introduced into the manganese oxide lattice structure.

Figure 3:
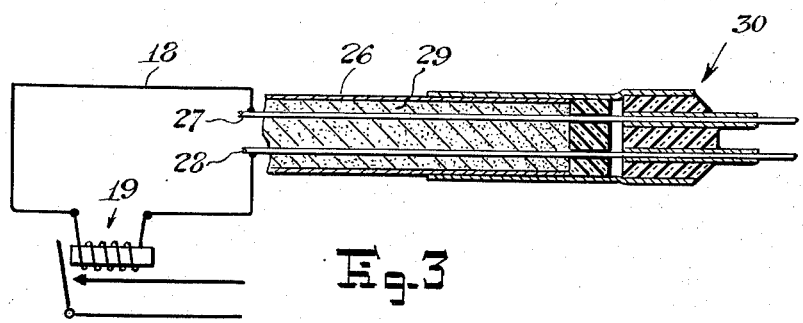
Figure 3 is a fractional sectional view of a thermocouple cable according to a second embodiment of my invention.

An alternative embodiment shown in Figure 3 comprises a sheath 26, two spaced internal wires 27 and 28 and a semiconductive spacing material 29. In this embodiment, the sheath serves merely as a protective covering, while the two wires 27 and 28 are made of any of the couples aforementioned so as to constitute the thermocouple members of the device. The semi-conductive material may in this embodiment be the same as before. The cable is formed by extruding the semi-conductive material onto the two wires while held in parallel juxtaposed position, and then threading the extrusion through the sheath. The sheath is preferably swaged to a reduced diameter to provide a solid construction, and a hermetic seal 30 of the type hereinbefore described is then provided at each end of the cable, as shown.

The salient features of the present thermocouple cable may be summarized as follows. It is necessary that the center wire and sheath be of dissimilar metals having good thermoelectric efficiency, and that the intermediary spacing material be essentially an insulator at low temperatures and a conductor at high temperatures. In its operation the cable must be heated for a sufficient duration to render the spacing material conductive throughout its cross sectional area so that it will provide a low resistance hot junction between the center wire and sheath, it being understood that the cold junctions are outside the heated zone where the circuit connections are made to the end terminals of the cable. The rate of response of the cable to such heating depends on its mass per unit length. For the illustrative dimensions herein given, the cable will respond to a varying temperature up to a frequency of about ¼ C. P. S. When the temperature source fluctuates at a higher frequency the cable provides essentially a D. C. thermocouple voltage dependent on the average temperature. Since the cable is thus adapted primarily for D. C. operation, the electronic semiconductive spacing material is preferably of the n or p type since ionic conductive material may under steady state operation introduce voltaic or polarization effects which may mask or interfere with the thermoelectric voltage.

The embodiments of my invention hereinabove particularly described, as well as the method of fabricating the semiconductive material, are illustrative and not necessarily limitative of my invention since the same are subject to many changes and modifications without departure from the scope of my invention, which I endeavor to express according to the following claims.

I claim:

1. A thermocouple of indefinite continuous length comprising two conductor elements extending side by side in spaced relation to each other, a spacing material between said conductor elements at points along the length thereof and in intimate electrical contact therewith, said spacing material having an inverse temperature-resistance characteristic causing it to have a high resistance at low temperatures and a relatively low resistance at high temperatures to provide a low-resistance junction between said conductive elements at any point where said spacing material is relatively highly heated, and said conductor elements comprising dissimilar metals having thermoelectric properties causing a thermoelectric voltage to be generated thereby whenever said spacing material is heated to form a hot junction between said elements.

2. The thermocouple set forth in claim 1 comprising an electrically-operable device and lead wires connecting said device and said conductor elements in a closed circuit, the junctions between said lead wires and said conductor elements being spaced from the portion of said conductor elements to be heated.

3. The thermocouple set forth in claim 1 wherein said spacing material comprises an electronic semiconductive oxide.

4. The thermocouple set forth in claim 1 wherein said spacing material comprises lithium-doped manganese oxide.

5. A thermocouple of indefinite continuous length comprising two elongated thermocouple elements extending side by side lengthwise thereof, an electric circuit serially including said elements, and a spacing material between said thermocouple elements comprising a semiconductor having an inverse temperature-resistance characteristic causing said spacing material to be essentially an insulator at low temperatures and to have a low resistance at relatively high temperatures whereby upon heating of said thermocouple elements and of the spacing therebetween at any point, a hot junction is formed between said elements with generation of a thermoelectric voltage in said circuit.

6. The thermocouple set forth in claim 5 wherein said spacing material consists predominantly of a material selected from the group consisting of the p-type and n-type electronic semi-conductive oxides.

7. A cable-type thermocouple of indefinite continuous length comprising a metal sheath, a pair of metal conductor wires in said sheath lengthwise thereof, a semiconductor operating said wires and in intimate electrical contact therewith, said semiconductor having an inverse resistance-temperature characteristic causing it to be essentially an insulator at low temperatures and a low resistance conductor at relatively high temperatures, said wires being of dissimilar metals forming a thermoelectric couple when any portion of said semiconductor is heated to form a hot junction between said wires.

8. A cable-type thermocouple of indefinite continuous length comprising a metal sheath, a wire in said sheath extending axially thereof, a circuit including said sheath and wire, said sheath and wire being of dissimilar metals forming a thermocouple when said sheath and wire are joined at any point, and means to provide a hot junction between said sheath and wire at any point therealong whereat the sheath is heated comprising a spacing material between said sheath and wire having an inverse temperature-resistance characteristic causing the spacing material to have a high resistance at low temperatures and a low resistance at relatively high temperatures.

9. A fire detection device free of sources of constant voltage comprising an electrically-operable device and a thermocouple in series therewith, said thermocouple being of indefinite continuous length comprising two metal conductors in spaced side-by-side relationship, a thermally-responsive spacing material in electrical contact with and disposed between said conductors, said spacing material being essentially an insulator between said conductors at lower temperatures and being electrically conductive when heated to a predetermined temperature to provide a hot junction between said conductors at any point where the spacing material is relatively highly heated, and said conductors being of dissimilar metals constituting a thermocouple to provide a thermoelectric voltage in said circuit to operate said device upon the heating of said spacing material at any point thereof to said predetermined temperature.

10. A fire detection apparatus comprising an electric circuit, an electrically-operable control device in said circuit, a thermocouple cable in said circuit comprising a metal sheath and center wire of dissimilar metals and an intervening medium of a temperature-responsive material which is essentially an insulator at lower temperatures and a conductor at flame temperatures, said cable being located in the zone under fire detection to cause said intervening medium to provide a hot junction between said dissimilar metals at whatever point on the cable the same is heated by fire impinging thereon, and said sheath and center wire being connected at points thereof out of said zone to respective terminals of said circuit forming cold junctions whereby upon any portion of the cable in said zone being heated by fire a thermocouple voltage is provided in said circuit to operate said control device.

References Cited in the file of this patent

UNITED STATES PATENTS

| 2,659,067 | Peters | Nov. 10, 1953 |
| 2,688,648 | McIlvaine | Sept. 7, 1954 |

FOREIGN PATENTS

| 653,864 | Great Britain | May 30, 1951 |
| 715,317 | Great Britain | Sept. 15, 1954 |